United States Patent [19]

Egner et al.

[11] Patent Number: 5,073,044
[45] Date of Patent: Dec. 17, 1991

[54] RIGHT ANGLE STRAIN RELIEF FOR OPTICAL FIBER CONNECTOR

[75] Inventors: Walter A. Egner, Harrisburg; Ronald A. Hileman, Camp Hill, both of Pa.

[73] Assignee: AMP Incorporated, Harrisburg, Pa.

[21] Appl. No.: 606,254

[22] Filed: Oct. 31, 1990

[51] Int. Cl.⁵ .......................... G02B 6/26; G02B 6/44
[52] U.S. Cl. ........................................ 385/86; 385/76; 385/100
[58] Field of Search ............... 350/96.2, 96.21, 96.22, 350/96.23

[56] References Cited

U.S. PATENT DOCUMENTS

| | | | |
|---|---|---|---|
| 3,032,737 | 5/1962 | Rottmann | 439/449 X |
| 4,082,422 | 4/1978 | Kloots | 350/96.23 |
| 4,167,303 | 9/1979 | Bowen et al. | 350/96.21 |
| 4,203,004 | 5/1980 | Cox | 174/135 |
| 4,319,802 | 3/1982 | Bowes | 350/96.2 |
| 4,611,887 | 9/1986 | Glover et al. | 350/96.21 |
| 4,652,082 | 3/1987 | Warner | 350/96.2 |
| 4,653,848 | 3/1987 | Kloots | 350/96.22 |
| 4,793,684 | 12/1988 | Oppenlander | 350/96.23 |
| 4,834,487 | 5/1989 | Abendschein et al. | 350/96.2 |
| 4,976,508 | 12/1990 | Okura et al. | 350/96.23 |
| 4,978,194 | 12/1990 | Allen et al. | 350/96.23 |

FOREIGN PATENT DOCUMENTS

| | | | |
|---|---|---|---|
| 0079160 | 10/1982 | European Pat. Off. | 350/96.2 X |
| 0106172 | 9/1983 | European Pat. Off. | 350/96.21 X |
| 0260774 | 5/1985 | European Pat. Off. | 350/96.2 X |
| 2069175 | 2/1981 | United Kingdom | 350/96.2 X |
| 2119120 | 4/1983 | United Kingdom | 350/96.2 X |

OTHER PUBLICATIONS

European Search Report Application No. 87201898.1 dated 1/23/89.
Int'l Search Report Application No. PCT/US 85/01000 dated 10/26/85.
Abstract for Japanese Application No. 57-57583, dated 10/83.

Primary Examiner—Brian Healy

[57] ABSTRACT

An optical fiber connector (1) comprises, an alignment ferrule (11) for aligning an optical fiber (3) of an optical cable (2) and a molded, flexible, curved rubber boot (9) extending along a line having a radius of curvature to extend the line 90 degrees from the plane of connection between the ferrule (11) and the boot (9).

2 Claims, 2 Drawing Sheets

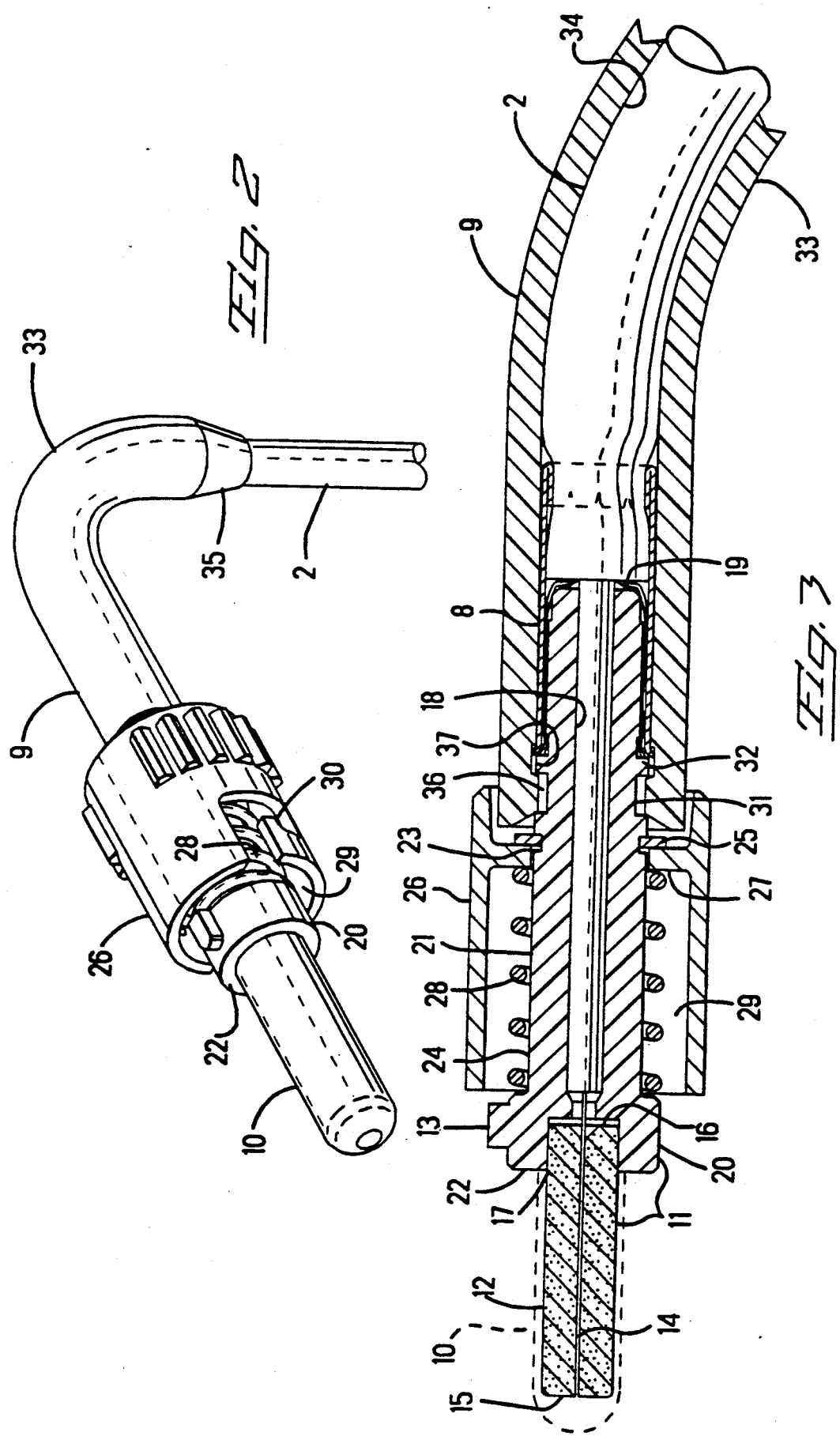

RIGHT ANGLE STRAIN RELIEF FOR OPTICAL FIBER CONNECTOR

FIELD OF THE INVENTION

The present invention relates to a right angle strain relief for optical fiber connectors.

BACKGROUND OF THE INVENTION

The present invention relates to an improvement to connectors for joining light transmitting fiber cables to transmitter and receiver devices and to other cables. In such connectors, it is important to project the fiber cable away from the connection in a manner that will not overstress or kink the buffered fiber. Overstressing or kinking may interfere with the signal transmitting characteristics of the fiber. However, it is not always possible to project the cable in a straight line from the connector, especially when routing the cable in tight quarters For example, oftentimes connection must be made to a transceiver located to the rear of a computer and toward a wall, requiring routing of the cable at an angle, indeed, at times a severe angle to the plane of the connection.

The present invention permits dressing cables from fiber optic connections at angles to the plane of the connection but without overstressing or kinking the buffered fiber to provide an improved strain relief and to maintain the travel of the cable from the connection area within required minimum bend radius parameters.

The present invention has applicability to a wide range of connectors, including connector assemblies for fixed shroud duplex systems, single mode and multi-mode bayonet type connectors and the like.

SUMMARY OF THE INVENTION

The present invention relates to a connector for joining one or more light transmitting fiber cables to transmitter and receiver devices, and to other cables wherein an improved right angle strain relief boot is provided to permit angle dressing of a fiber cable of the connector from the point of connection. The invention is described as an optical connector comprising, an alignment ferrule having a central passage for aligning an optical fiber of an optical cable, and further comprising a molded, flexible, curved rubber boot having a cylindrical axial bore sized for receiving the optical fiber cable therewithin, fitted to the rear of said ferrule, and extending along a line having a radius of curvature to extend the line ninety degrees from the plane of connection between said ferrule and said boot.

The present invention is an improvement to optical connectors such as those disclosed by U.S. Pat. No. 4,834,487, for example, comprising an alignment ferrule having a central passage for aligning an optical fiber. The ferrule has a radially enlarged collar and a circumferential groove spaced from a rear transverse face of the collar. The ferrule has a rear circumferential groove and flange. The connector further comprises a snap ring mounted in the groove, a coupling nut moveable axially over the ferrule having a transverse inner flange encircling the alignment ferrule forwardly of the snap ring, and a spring for compression directly in engagement against a rear transverse face of the collar and for compression against the inner flange. There is a clearance between the coupling nut and the collar in which the collar is moveable during relative rearward movement of the collar to compress the spring.

The present invention also relates to SMA type connectors improved by means of the right angle strain relief boot where the connector is described as comprising, a conical profiled ferrule having a central passageway for receiving and aligning a fiber optic cable, a tubular contact body encompassing the ferrule, and a coupling nut having a central bore for receiving the contact body and the conical profiled ferrule therein by press fit. The ferrule has a rear circumferential groove and flange.

Further, the present invention may be described as an improvement to a connector such as that taught by Ser. No. 450,330, filed Dec. 13, 1989, where the connector assembly comprises a shell encircling a spring biased holder for an optical fiber, a sheath to prevent leaking of adhesive from the holder, and wherein the strength members of the optical fiber cable are anchored to the shell. The holder and the optical fiber of the cable are displaceable with respect to the strength members of the cable.

The right angle strain relief of the present invention also has applicability to connectors of the type taught by Bowen, et al, U.S. Pat. No. 4,167,303, wherein the connector assembly includes a housing with at least one cable receiving bore therein; an assembly including an annular crimping ring, a profiled ferrule member, and a helical spring member secured to an end of each cable; and a cap member securing the ferrule members in the housing member in a spring loaded condition.

Further, the present invention is applicable as part of a connector including a connector assembly such as that disclosed by Glover, et al, U.S. Pat. No. 4,611,887, in which the connector assembly comprises a housing member having a passageway extending therethrough. Further included is a receptacle connector member latchably mounted to the passageway and having therein fiber optic connectors terminated to ends of fiber optic transmission members and to said portion of optical fiber cable. The fiber optic connectors are mounted in the receptacle connector member as spring biased connectors with profiled resilient front ends of the connectors disposed in profiled bores of alignment ferrules that are floatably mounted in the receptacle connector member. Further included is a plug connector member having mounted therein spring biased fiber optic connectors terminated to ends of fiber optic transmission members. Latch members on the plug connector member latchably secure the plug connector member in the housing member with profiled resilient front ends of the fiber optic connectors being disposed in the profiled bores of the alignment ferrules thereby connecting the respective fiber optic transmission members together under spring force.

BRIEF DESCRIPTION OF THE DRAWINGS

For an understanding of the invention, reference will now be made to a detailed description accompanied by drawings in which:

FIG. 2 is a perspective view of the assembled connector, optical fiber cable, crimp ferrule and right angle strain relief of the present invention.

FIG. 3 is a side elevation in section of the connector, optical fiber cable, crimp ferrule and right angle strain relief of FIG. 2.

DETAILED DESCRIPTION

Figure 1:
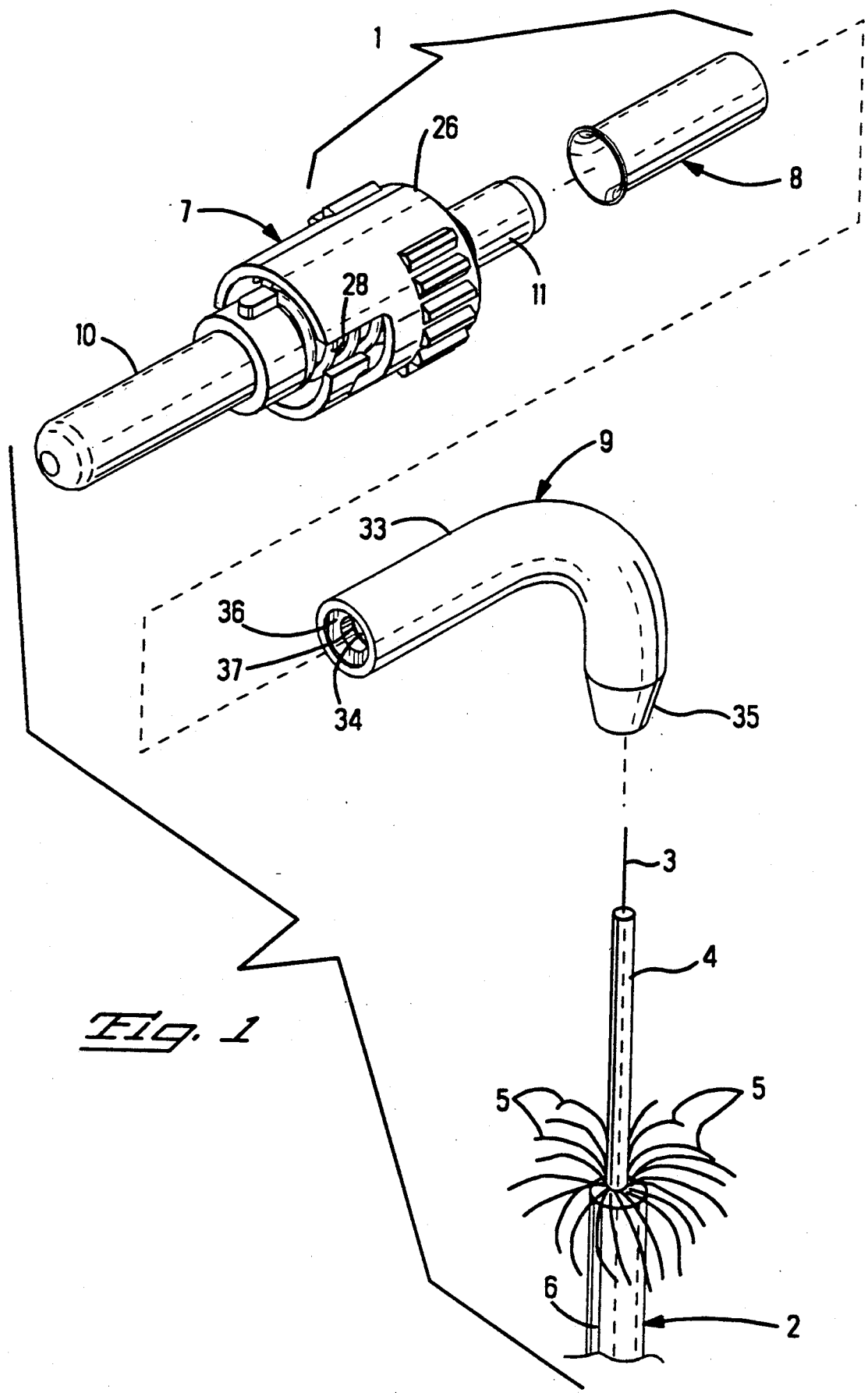
FIG. 1 is a fragmentary perspective view of a connector together with an optical fiber cable, a crimp ferrule and a right angle strain relief of the present invention.

Referring to FIGS. 1, 2 and 3, an optical connector 1 is shown for an optical fiber cable 2. As shown in FIG. 1, the cable 2 includes an elongated central optical fiber 3 concentrically encircled by a buffer 4 together comprising a buffer covered fiber 3, 4. The cable 2 includes a load bearing portion of elongated strength members 5 that extend axially along the cable 2. The strength members 5 are distributed over the outer diameter of the buffer covered fiber 3,4. The cable 2 further includes an outer jacket 6 of polymeric material enclosing the strength members 5. Parts of the cable 2 are cut away as shown to provide a length of fiber 3 projecting from the buffer 4, and a length of the buffer covered fiber 3, 4 projecting from the strength members 5, and lengths of the strength members 5 projecting from the jacket 6.

Referring to FIGS. 1, 2 and 3, the connector 1 includes an optical connector assembly 7 and a crimp ferrule 8. A right angle strain relief boot 9 characterizing the present invention is also shown. The connector assembly 7 includes a rigid alignment ferrule 11 in the form of a ceramic portion 12 enclosed by protective dust cover 10 and a metal portion 13. The ceramic portion 12 has an axial central passage 14 through front end 15 for aligning the optical fiber 3 of the cable 2. A rear end 16 of the ceramic portion 12 is mounted in a socket 17 of the metal portion 13. The metal portion 13 has an axial passage 18 aligned with the passage 14, and emerging from a rear end 19 of the alignment ferrule 11 for connection to the optical fiber cable 2. The alignment ferrule 11 includes, a radially enlarged collar 20 with front face 22 on the metal portion 13 and surrounding the ferrule 11, a cylindrical surface 21 of the ferrule portion 13 intersecting the collar 20, and a circumferential groove 23 spaced from a transverse rear face 24 of the collar 20. The connector assembly 7 further includes, a snap ring 25 mounted in the groove 23, a coupling nut 26 moveable axially over the alignment ferrule 11 and having a transverse radially projecting, inner flange 27 encircling the alignment ferrule 11 forwardly of the snap ring 25, a coil spring 28 for compression directly in engagement against the rear face 24 of the collar 20 and for urging a force of compression against the inner flange 27, and a clearance 29 between the coupling nut 26 and the collar 20. The metal portion 13 further includes annular groove 31 and annular flange 32 for connection to the right angle strain relief 9 as hereinafter described.

The coupling nut 26 has bayonet type slots 30 for connection with a known complementary connector, not shown. The front end 15 of the ceramic portion 12 is rigid and is constructed to enter an alignment sleeve, not shown, of a complementary connector like the connector 1. In response to abutment of the front end 15 with an alignment ferrule like the alignment ferrule 11, of the complementary connector, the collar 20 is moveable with the coupling nut 26 to compress the spring 28 and produce a spring bias to urge the front end 15 into desired abutment. The collar 20 is moveable in and along the clearance 29 during retraction of the collar 20 into the coupling nut 26 to compress the spring 28.

The right angle strain relief boot 9 provides heavy duty, abrasion and crush protection to fiber optic cable 2 while permitting bending of the cable to small radii. The strain relief boot 9 is a molded, flexible, curved rubber boot of generally right angle cylindrical shape made from a suitable material such as an ethylene, propylene copolymer. The boot 9 has a generally cylindrical portion 33, curved along a curved line having a radius of curvature to extend the line at a right angle with cylindrical axial bore 34, and a tapering end portion 35. The front end of the bore 34 is characterized by a radial internal flange 36 and an inner annular recess 37. The boot 9 and the optical connector assembly 7 fit to one another by snap together, interlocking fit with the flange 36 of the boot 9 nested in complementary fit with annular groove 31 of alignment ferrule 11, and with recess 37 of the boot 9 receiving annular flange 32 of the alignment ferrule 11. The boot 9 is connected to the connector assembly 7 by inserting the surface 21 of ferrule 11 into the bore 34 of boot 9, and working slidably the boot 9 over the surface 21 until flange 36 and recess 37 snap together into complementary interlocked fit with annular groove 31 and flange 32, respectively. The boot 9 of the present invention, as shown, projects the cable 2 at a right angle to the plane of connection between the cable 2 and the connector assembly 7 without overstressing or kinking of the cable 2.

Further, it should be recognized that the connector of the present invention may include other types of connector assemblies. Accordingly, it should be understood that the invention is to be limited only insofar as required by the scope of the following claims.

We claim:
1. An optical connector comprising;
   an alignment ferrule having a central passage for aligning an optical fiber of an optical cable;
   molded, flexible curved rubber boot having a cylindrical axial bore sized for receiving the optical fiber cable therewithin;
   the alignment ferrule having a central passage for aligning an optical fiber, and having a radially enlarged collar and a circumferential groove spaced from a rear transverse face of the collar, and having a rear circumferential groove and a flange;
   a snap ring mounted in the groove;
   a coupling nut moveable axially over the ferrule and having a transverse inner flange encircling the alignment ferrule forwardly of the snap ring;
   a spring for compression directly in engagement against the rear transverse face of the collar and for compression against the inner flange;
   a clearance between the coupling nut and the collar in which the collar is moveable during retraction of the collar into the coupling nut to compress the spring;
   said boot having a cylindrical axial bore sized for receiving the optical fiber cable therewithin;
   an annular flange and a recess within axial bore at a front end of said boot complementarily fitted to said rear circumferential groove and said flange of said ferrule;
   and said boot having a curvature along a curved line extending the cable 90 degrees to the plane of connection between said ferrule and said boot.

2. An optical connector as recited in claim 1 wherein, the boot and the alignment ferrule interengage with a snap together interlocking fit.

* * * * *